United States Patent
Cao

(10) Patent No.: US 12,289,616 B2
(45) Date of Patent: Apr. 29, 2025

(54) ELECTRONIC DEVICE FOR WIRELESS COMMUNICATION, METHOD, AND COMPUTER READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION

( * ) Notice: Subject to any disclaimer, the term of this patent is extended or adjusted under 35 U.S.C. 154(b) by 353 days.

(21) Appl. No.: 17/791,922

(22) PCT Filed: Feb. 22, 2021

(86) PCT No.: PCT/CN2021/077198
§ 371 (c)(1),
(2) Date: Jul. 11, 2022

(87) PCT Pub. No.: WO2021/169904
PCT Pub. Date: Sep. 2, 2021

(65) Prior Publication Data
US 2023/0044880 A1    Feb. 9, 2023

(30) Foreign Application Priority Data

Feb. 27, 2020    (CN) .......................... 202010124115.7

(51) Int. Cl.
*H04L 5/00*    (2006.01)
*H04W 16/28*    (2009.01)
*H04W 24/10*    (2009.01)

(52) U.S. Cl.
CPC ........... *H04W 16/28* (2013.01); *H04L 5/0051* (2013.01); *H04W 24/10* (2013.01)

(58) Field of Classification Search
CPC ....... H04L 5/0051; H04L 5/0053; H04L 5/14; H04W 16/28; H04W 24/10; H04W 72/046; H04W 72/1263
See application file for complete search history.

(56) References Cited

U.S. PATENT DOCUMENTS 11,051,282 B2 *    6/2021    Chen ...................... H04W 72/21
2019/0103908 A1 *    4/2019    Yu ......................... H04B 7/0617
(Continued)

FOREIGN PATENT DOCUMENTS

CN          110073609 A    7/2019
WO    WO-2018232090 A1    12/2018
(Continued)

OTHER PUBLICATIONS

International Search Report and Written Opinion mailed on May 20, 2021, received for PCT Application PCT/CN2021/077198, filed on Feb. 22, 2021, 9 pages including English Translation.
(Continued)

*Primary Examiner* — Alpus Hsu
(74) *Attorney, Agent, or Firm* — XSENSUS LLP

(57) ABSTRACT

Provided are an electronic device for wireless communication, a method, and a computer readable storage medium. The electronic device comprises: a processing circuit, configured to obtain configuration information of a unified transmission configuration indication state from a base station, the unified transmission configuration indication state being used for indicating both a downlink beam and an uplink beam; and to execute a beam management-related operation on the basis of the configuration information.

16 Claims, 10 Drawing Sheets

(56) References Cited

U.S. PATENT DOCUMENTS

| | | | |
|---|---|---|---|
| 2019/0312698 A1 | 10/2019 | Akkarakaran et al. | |
| 2020/0145866 A1* | 5/2020 | Onggosanusi | H04B 7/0617 |
| 2020/0280409 A1* | 9/2020 | Grant | H04L 5/0044 |
| 2020/0413390 A1* | 12/2020 | Rahman | H04L 5/0051 |
| 2021/0058998 A1* | 2/2021 | Yuan | H04W 72/21 |
| 2021/0084640 A1* | 3/2021 | Kang | H04L 5/0048 |
| 2021/0136741 A1* | 5/2021 | Onggosanusi | H04W 72/23 |
| 2021/0160881 A1* | 5/2021 | Rahman | H04W 72/046 |
| 2021/0243622 A1* | 8/2021 | Tekgul | H04B 7/0632 |
| 2021/0329517 A1* | 10/2021 | Noh | H04L 5/0096 |
| 2022/0123818 A1* | 4/2022 | Li | H04B 7/0695 |

FOREIGN PATENT DOCUMENTS

| | | |
|---|---|---|
| WO | 2019/049096 A1 | 3/2019 |
| WO | 2019/195528 A1 | 10/2019 |

OTHER PUBLICATIONS

Nokia et al., "Enhancements on Multi-Beam Operation", 3GPP TSG RAN WG1 #97 Meeting, R1-1907317, May 13-17, 2019, 18 pages.

* cited by examiner

```
-- ASN1START
-- TAG-TCI-STATE-START

TCI-State ::=               SEQUENCE {
    tci-StateId                 TCI-StateId,
    qcl-Type1                   QCL-Info,
    qcl-Type2                   QCL-Info                    OPTIONAL,  -- Need R
    ...
}

QCL-Info ::=                SEQUENCE {
    cell                        ServCellIndex               OPTIONAL,  -- Need R
    bwp-Id                      BWP-Id                      OPTIONAL,  -- Cond CSI-RS-Indicated
    referenceSignal             CHOICE {
        csi-rs                      NZP-CSI-RS-ResourceId,
        ssb                         SSB-Index
    },
    qcl-Type                    ENUMERATED {typeA, typeB, typeC, typeD},
    ...
}

-- TAG-TCI-STATES-STOP
-- ASN1STOP
```

Figure 1

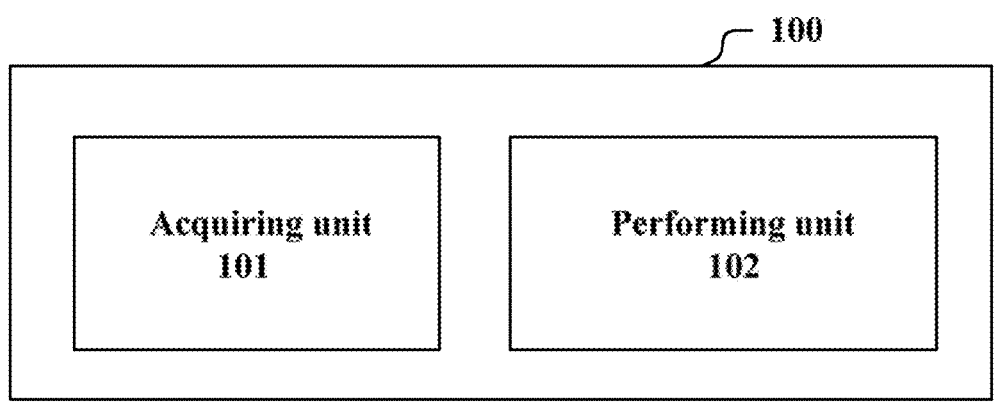

Figure 2

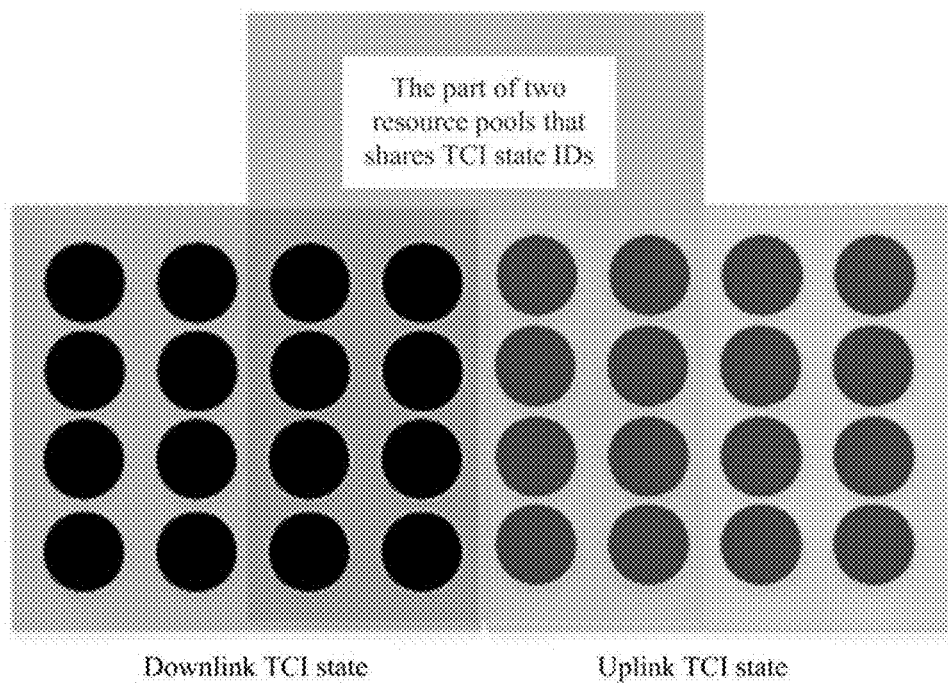

Figure 3

*Unified TCI-State* information element

```
-- ASN1START
-- TAG-TCI-STATE-START

TCI-State ::=               SEQUENCE {
    U-tci-StateId               TCI-StateId,
    qcl-Type1                   QCL-Info,
    qcl-Type2                   QCL-Info                OPTIONAL,    -- Need R
    ...
}

QCL-Info ::=                SEQUENCE {
    cell                        ServingCellID           OPTIONAL,    -- Need R
    bwp-Id                      BWP-Id                  OPTIONAL,    -- Cond CSI-RS-Indicated or SRS
    referenceSignal             CHOICE {
        csi-rs                      NZP-CSI-RS-ResourceId,
        ssb                         SSB-Index,
        srs                         SRS-ResourceId
    },
    qcl-Type                    ENUMERATED {typeA, typeB, typeC, typeD},
    ...
}

-- TAG-TCI-STATE-STOP
-- ASN1STOP
```

Figure 4

ELECTRONIC DEVICE FOR WIRELESS COMMUNICATION, METHOD, AND COMPUTER READABLE STORAGE MEDIUM

CROSS-REFERENCE TO RELATED APPLICATIONS

This application is based on PCT filing PCT/CN2021/077198, filed Feb. 22, 2021, which claims priority to Chinese Patent Application No. 202010124115.7 titled "ELECTRONIC DEVICE FOR WIRELESS COMMUNICATION, METHOD, AND COMPUTER READABLE STORAGE MEDIUM", filed on Feb. 27, 2020 with the China National Intellectual Property Administration (CNIPA), each of which is incorporated herein by reference in its entirety.

FIELD

The present disclosure relates to the technical field of wireless communications, in particular to a beam management technology in a wireless communication system. More particularly, the present disclosure relates to an electronic apparatus and a method for wireless communications and a computer-readable storage medium.

BACKGROUND

In 5G Rel. 15/Re. 16, a transmission configuration indication (TCI) state corresponds to a channel state information-reference signal (CRI-RS) or a synchronization signal block (SSB), which may indicate a direction of a downlink transmitting beam used by a network side device such as a base station to user equipment (UE). The network side device may configure multiple TCI states for the UE, and each of the TCI states corresponds to a reference signal (CRI-RS or SSB), that is, corresponding to a direction of a transmitting beam. Optionally, the network side device may activate or indicate one or more of the configured TCI states for the UE.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry. The processing circuitry is configured to: acquire, from a base station, configuration information of a unified transmission configuration indication state, where the unified transmission configuration indication state is used to indicate both a downlink beam and an uplink beam; and perform an operation related to beam management based on the configuration information.

A method for wireless communications is provided according to another aspect of the present disclosure. The method includes: acquiring, from a base station, configuration information of a unified transmission configuration indication state, where the unified transmission configuration indication state is used to indicate both a downlink beam and an uplink beam; and performing an operation related to beam management based on the configuration information.

An electronic apparatus for wireless communications is provided according to an aspect of the present disclosure. The electronic apparatus includes processing circuitry. The processing circuitry is configured to: transmit, to user equipment, configuration information of a unified transmission configuration indication state, where the unified transmission configuration indication state is used to indicate both a downlink beam and an uplink beam; and perform an operation related to beam management based on the configuration information.

A method for wireless communications is provided according to another aspect of the present disclosure. The method includes: transmitting, to user equipment, configuration information of a unified transmission configuration indication state, where the unified transmission configuration indication state is used to indicate both a downlink beam and an uplink beam; and performing an operation related to beam management based on the configuration information.

According to other aspects of the present disclosure, there are further provided computer program codes and computer program products for implementing the methods for wireless communications above, and a computer readable storage medium having recorded thereon the computer program codes for implementing the methods for wireless communications described above.

The electronic apparatus and the method according to the embodiments of the present disclosure can, by using the unified TCI state indicating both the downlink beam and uplink beam, use the unified TCI state to simultaneously manage the downlink beam and uplink beam, reducing the signaling overhead.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 1 shows pseudo codes of configuring a TCI-state information element through a radio resource control parameter;

FIG. 2 is a block diagram showing functional modules of an electronic apparatus for wireless communications according to an embodiment of the present disclosure:

FIG. 3 shows an example of a case where uplink TCI states and downlink TCI states partially share identifiers;

FIG. 4 shows an example of a unified TCI state information element according to an embodiment of the present disclosure;

DETAILED DESCRIPTION OF EMBODIMENTS

Figure 5:
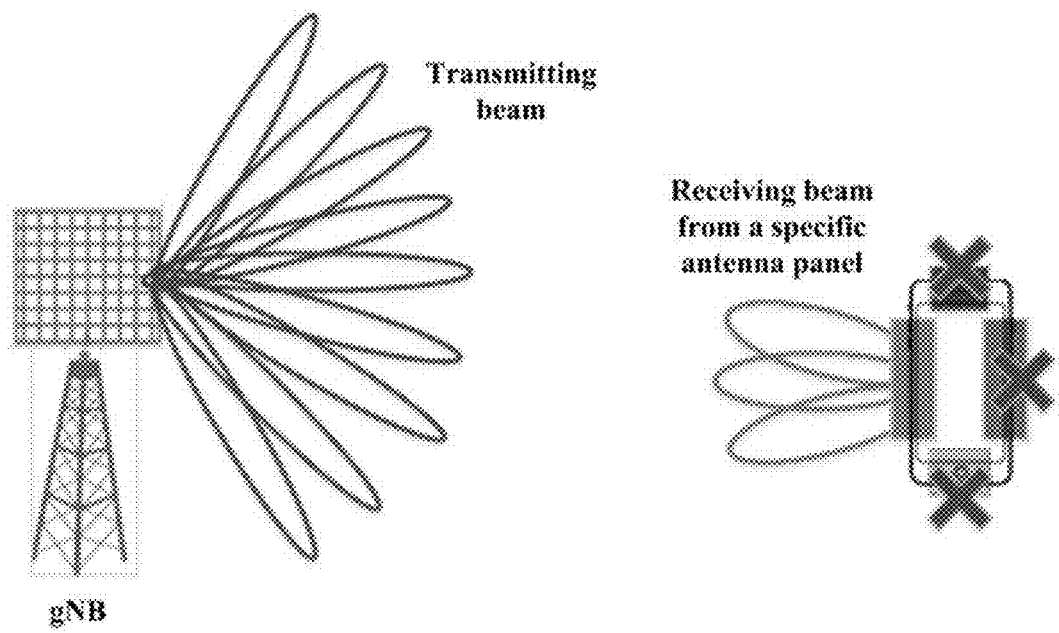
FIG. 5 shows an example where a specific antenna panel measures a downlink reference signal.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As described above, a TCI state is used to indicate a downlink beam of a serving cell. Each TCI state corresponds to a downlink reference signal (CSI-RS or SSB), that is, a direction of a downlink transmitting beam. The TCI state is configured by configuring a TCI-state information element through a radio resource control (RRC) parameter, as shown in FIG. 1. tci-StateID represents an identifier (ID) of the TCI state, ServCellIndex represents an identifier (ID) of the serving cell of the UE, NZP-CSI-RS-ResourceId represents an ID of CSI-RS resources corresponding to the TCI state, and SSB-Index represents an ID of the SSB corresponding to the TCI state.

It can be seen that an indexed reference signal in the TCI state information element is a downlink reference signal, and thus cannot be used to indicate an uplink beam. In order to solve the problem, a unified TCI state is proposed according to the embodiment, which may be used for both the uplink beam and the downlink beam.

FIG. 2 is a block diagram showing functional modules of an electronic apparatus 100 for wireless communications according to an embodiment of the present disclosure. As shown in FIG. 2, the electronic apparatus 100 includes an acquiring unit 101 and a performing unit 102. The acquiring unit 101 is configured to acquire, from a base station, configuration information of a unified TCI state, where the unified TCI state is used to indicate both a downlink beam and an uplink beam. The performing unit 102 is configured to perform an operation related to beam management based on the configuration information.

The acquiring unit 101 and the performing unit 102 may be implemented by one or more processing circuitry: The processing circuitry may be implemented as, for example, a chip or a processor. Moreover, it should be noted that, functional units in the electronic apparatus shown in FIG. 2 are only logical modules which are divided based on the specific functions thereof, and are not intended to limit the specific implementations.

The electronic apparatus 100 may be arranged at a UE side or may be communicatively connected to the UE. Here, it should be further noted that the electronic apparatus 100 may be implemented at a chip level or an apparatus level. For example, the electronic apparatus 100 may function as the UE itself and may further include external devices such as a memory, a transceiver (not shown) or the like. The memory may be configured to store programs and related data information that are required to be executed for the UE to implement various functions. The transceiver may include one or more communication interfaces to support communications with different apparatus (for example, a base station, other UE or the like). Implementations of the transceiver are not limited herein.

In an example, the configuration information of the unified TCI state includes individual configuration information for an uplink TCI state and for a downlink TCI state. For example, the downlink TCI state may use a TCI state in the existing architecture (hereinafter also referred to as the downlink TCI state), and on this basis, the uplink TCI state may be further defined to indicate a direction of the uplink beam. In this case, a pool of the uplink TCI states may be defined in PUSCH-Config. The configuration of the uplink TCI state may be similar to that in FIG. 1. For example, tci-StateId is replaced with ul-tci-StateId, and the indexed reference signal is replaced with an uplink reference signal, such as a sounding reference signal (SRS).

The base station may activate or deactivate the downlink beam through a media access control-control element (MAC CE). For example, an identifier (ID) of a downlink TCI state corresponding to a to-be-activated downlink beam or a to-be-deactivated downlink beam may be included in the MAC CE to be transmitted to the UE. Similarly, the base station may activate or deactivate the uplink beam through the MAC CE. For example, an ID of an uplink TCI state corresponding to the to-be-activated downlink beam or the to-be-deactivated uplink beam may be included in the MAC CE to be transmitted to the UE.

The performing unit 102 is configured to perform, based on the acquired configuration information, an operation related to beam management, such as beam measurement, reporting, and the like for mobility management. In addition, the performing unit 102 is further configured to perform beam activation, beam deactivation and the like after receiving the MAC CE signaling. Furthermore, when the MAC CE is to activate a data beam, the performing unit 102 is further configured to dynamically determine one of the activated data beams as a transmitting beam of a physical downlink shared channel (PDSCH) or a physical uplink shared channel (PUSCH) based on downlink control information (DCI) transmitted by the base station.

In addition, in order to reduce signaling overhead, a single MAC CE may be designed to activate or deactivate the uplink TCI state and the downlink TCI state for uplink and downlink respectively. For example, the uplink TCI states and the downlink TCI states at least partially share the IDs, and the acquiring unit 101 is configured to acquire, from the base station, a MAC CE including an identifier of a target TCI state, and in a case that the ID of the acquired target TCI state is a shared ID, simultaneously activate or deactivate an uplink TCI state and a downlink TCI state corresponding to the shared ID. The ID of the target TCI state is an ID of a to-be-activated TCI state or a to-be-deactivated TCI state.

FIG. 3 shows an example of a case where uplink TCI states and downlink TCI states partially share IDs. In the example of FIG. 3, it is assumed that a maximum number of the uplink TCI state and a maximum number of the downlink TCI state configurable by the RRC signaling each are 128, and then the MAC CE signaling includes IDs of eight activated TCI states. As shown in FIG. 3, among a pool of the uplink TCI states defined in PUSCH-Config and a pool of the downlink TCI states defined in PDSCH-Config, there are IDs of eight TCI states which are the same as each other. Therefore, in a case that the MAC CE signaling includes the eight IDs, eight downlink TCI states and eight uplink TCI states corresponding to the eight IDs may be indicated, so that a single piece of MAC CE signaling may simultaneously activate or deactivate the uplink beam and the downlink beam.

In another example, the conventional TCI state may be modified to acquire a unified TCI state. For example, the configuration information of the unified TCI state includes an index to a reference signal among the uplink reference signal and the downlink reference signal. The uplink reference signal includes SRS, and the downlink reference signal includes CSI-RS and SSB. Quasi-Co-Location (QCL) types of CSI-RS, SSB and SRS each are QCL-Type D, which is related to a spatial receiving filter.

FIG. 4 shows an example of a unified TCI state information element according to an embodiment of the present disclosure. Compared with FIG. 1, an index to SRS is added in the example shown in FIG. 4. In other words, the TCI state of the uplink beam may be directly configured by the index to the SRS.

The acquiring unit 101 is further configured to receive an indication of the target TCI state through the MAC CE or the DCI. The target TCI state herein refers to the to-be-activated TCI state or the to-be-deactivated TCI state or a to-be-indicated TCI state. The TCI state herein is the unified TCI state. For example, the MAC CE or the DCI may include the identifier of the target TCI state, such as U-tci-StateId shown in FIG. 4.

The base station may activate or deactivate one or more of the configured multiple uplink beams or downlink beams through MAC CE signaling. In a case that a control beam such as the PDCCH and the PUCCH is activated by MAC CE, the performing unit 102 is configured to activate a beam on a control resource set (CORESET) where the PDCCH and the PUCCH are located. In a case that a data beam is activated by the MAC CE, the performing unit 102 is further configured to dynamically determine one of the activated data beams as the transmitting beam of the PDSCH or the PUSCH based on the DCI transmitted by the base station. In such a case, the TCI state indicated by the DCI is the target TCI state.

In a case that the unified TCI state includes an index to the uplink reference signal (such as SRS), the performing unit 102 is configured to determine to transmit an uplink channel such as the PUCCH or the PUSCH using a transmitting beam for transmitting an uplink reference signal corresponding to the target TCI state, and receive a downlink channel such as the PDCCH or the PDSCH using the transmitting beam.

In a case that the unified TCI state includes an index to the downlink reference signal (such as CSI-RS or SSB), the performing unit 103 is configured to determine to receive the downlink channel using a receiving beam previously for measuring a downlink reference signal corresponding to the target TCI state, and transmit the uplink channel using the receiving beam.

In addition, the UE may be equipped with multiple antenna panels, and may use an ID of an SRS resource set for uplink beam management as an ID of each of the antenna panels. During uplink beam scanning, each of the antenna panels is assigned an exclusive SRS resource set, and uses SRS resources in the resource set for uplink beam scanning.

The UE may inform a network side, such as the base station, through signaling of UE capability that the UE is equipped with multiple antenna panels. The network side may activate, through RRC signaling configuration or the MAC CE, that the UE uses a specific antenna panel or a combination of multiple antenna panels to measure the downlink reference signal (such as CSI-RS or SSB), for example, measure L1-RSRP (that is, layer-1 reference signal receiving power) or L1-SINR (that is, layer-1 signal to interference and noise ratio) received by the antenna panel or the combination of the antenna panels. FIG. 5 shows an example of a specific antenna panel measuring a downlink reference signal.

In other words, the performing unit 102 may measure the downlink reference signal using one or more specified antenna panels. As a way, the acquiring unit 101 may acquire, from the base station, information of the one or more specified antenna panels, for example, may acquire an ID of a SRS resource set corresponding to the antenna panel. As another way, the performing unit 102 may determine one or more antenna panels by itself, and report IDs of the one or more antenna panels to the base station for subsequent beam indication.

In such a case, in a case that the unified TCI state includes an index to the downlink reference signal (such as CSI-RS or SSB), the performing unit 103 determines that an antenna panel previously for measuring the downlink reference signal and a beam on the antenna panel are to be used to receive the downlink channel. In other words, the receiving beam is a beam on the one or more specified antenna panels.

In addition, in a case that a receiving beam of the downlink reference signal corresponds to a transmitting beam of the SRS, the receiving beam is further used to transmit the uplink channel.

In this way; the unified TCI state in the embodiment may support downlink receiving of the specified antenna panel(s) and the beam by the UE, and the unified TCI state is associated with the specific antenna panel or a combination of antenna panels.

Similarly, in a case that the unified TCI state includes the index to the uplink reference signal (such as SRS), the performing unit 103 may determine an antenna panel and a beam on the antenna panel to transmit the uplink channel based on an ID of a SRS resource set where the SRS is located, and may further receive the downlink channel using the transmitting beam. The SRS resource set where the SRS is located is for the purpose of being used for Codebook or non-codebook transmitting.

Figure 6:
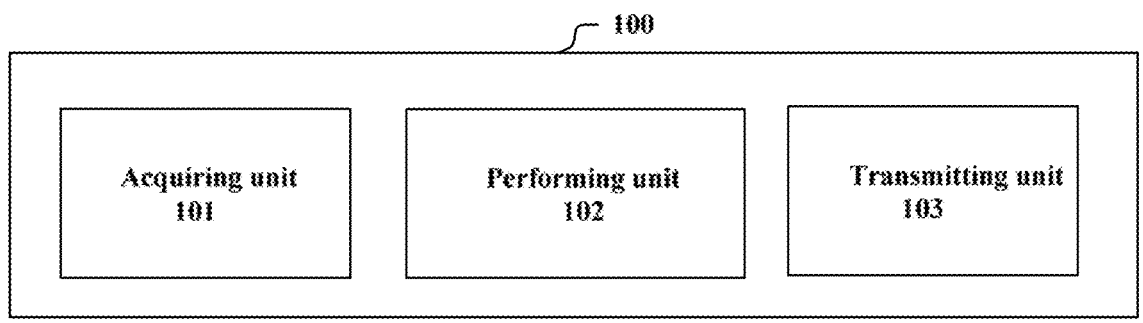
FIG. 6 is a block diagram showing functional modules of an electronic apparatus for wireless communications according to an embodiment of the present disclosure.

On the other hand, as shown in FIG. 6, the electronic apparatus 100 further includes a transmitting unit 103. The transmitting unit 103 is configured to report the ID of the target TCI state to the base station in a case that a failure occurs on the uplink transmission and/or radiation exceeds maximum permissible exposure (MPE), so that the base station determines an antenna panel based on the ID. For example, the transmitting unit 103 may report through the MAC CE or the RRC signaling.

Since the antenna panel of the UE may cause excessive radiation to the human or the antenna panel may fail, it is required to report information of a faulty antenna panel to the base station, so that the base station may suspend actions such as beam measurement, and reporting of the antenna panel. That is, the base station may instruct the UE not to use the antenna panel for uplink transmission.

The transmitting unit 103 may directly report an ID of a faulty antenna panel. In the embodiment, the target TCI state is associated with one or more specific antenna panels, and thus the transmitting unit 103 may report the faulty antenna panel to the base station by reporting the ID of the target TCI state.

Figure 7:
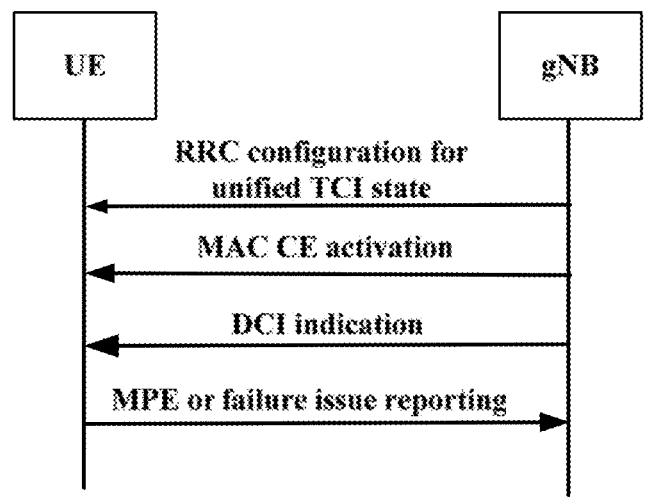
FIG. 7 shows an example of an information procedure between a base station and user equipment.

For ease of understanding, FIG. 7 shows an example of an information procedure between a UE and a gNB according to the embodiment. The gNB transmits configuration information of the unified TCI state to the UE through RRC signaling. The unified TCI state is used to indicate both the downlink beam and the uplink beam. Subsequently, the gNB activates one or more unified TCI states through MAC CE signaling, that is, activates one or more uplink beams and one or more downlink beams. For a data channel, the gNB further indicates, through DCI, that one of multiple activated data beams is used to transmit the PDSCH or the PUSCH. In addition, in a case that a failure and/or MPE problem occurs on the uplink transmission, UE further reports through MAC CE or RRC signaling.

In summary, the electronic apparatus 100 according to the embodiment enables, by using the unified TCI state indicating both the downlink beam and uplink beam, to simultaneously manage the downlink beam and uplink beam by using the unified TCI state, reducing the signaling overhead.

Second Embodiment

Figure 8:
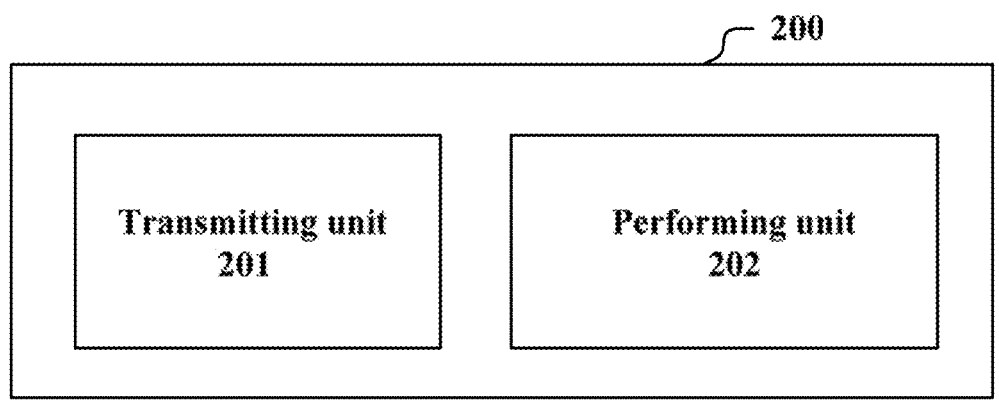
FIG. 8 is a block diagram showing functional modules of an electronic apparatus for wireless communications according to another embodiment of the present disclosure.

FIG. 8 is a block diagram showing functional modules of an electronic apparatus 200 for wireless communications according to another embodiment of the present disclosure. As shown in FIG. 8, the electronic apparatus 200 includes a transmitting unit 201 and a performing unit 202. The transmitting unit 201 is configured to transmit, to the UE, configuration information of a unified TCI state, where the unified TCI state is used to indicate both a downlink beam and an uplink beam. The performing unit 202 is configured to perform an operation related to beam management based on the configuration information.

The transmitting unit 201 and the performing unit 202 may be implemented by one or more processing circuitry. The processing circuitry may be implemented as, for example, a chip or a processor. Moreover, it should be noted that, functional units in the electronic apparatus shown in FIG. 8 are only logic modules which are divided based on the specific functions thereof, and are not intended to limit the implementations.

The electronic apparatus 200 may be arranged at a base station side or may be communicatively connected to the base station. The base station described in the present disclosure may be a transmit receive point (TRP) or an access point (AP). Here, it should be further noted that the electronic apparatus 200 may be implemented in a chip level or an apparatus level. For example, the electronic apparatus 200 may function as the base station itself and may further include external devices such as a memory, a transceiver (not shown) or the like. The memory may be configured to store programs and related data information that are required to be executed when the base station implements various functions. The transceiver may include one or more communication interfaces to support communications with different apparatus (for example, UE, other base stations or the like). Implementations of the transceiver are not limited herein.

In an example, the configuration information of the unified TCI state includes individual configuration information for an uplink TCI state and for a downlink TCI state. For example, the downlink TCI state may use a TCI state in the conventional architecture (hereinafter also referred to as the downlink TCI state), and on this basis, the uplink TCI state may be additionally defined to indicate a direction of the uplink beam. In this case, a pool of the uplink TCI states may be defined in PUSCH-Config. The configuration of the uplink TCI state may be similar to that in FIG. 1. For example, tci-StateId is replaced with ul-tci-StateId, and the indexed reference signal is replaced with an uplink reference signal, such as a sounding reference signal (SRS).

As described above, the base station may activate or deactivate the downlink beam through the MAC CE. For example, the transmitting unit 201 may further include an identifier (ID) of a downlink TCI state corresponding to a to-be-activated downlink beam or a to-be-deactivated downlink beam in the MAC CE to be transmitted to the UE. Similarly, the base station may activate or deactivate the uplink beam through the MAC CE. For example, the transmitting unit 201 may include an ID of an uplink TCI state corresponding to the to-be-activated uplink beam or the to-be-deactivated uplink beam in the MAC CE to be transmitted to the UE.

The performing unit 202 is configured to perform, based on the above mentioned configuration information, an operation related to beam management, such as activation or indication of the uplink beam and the downlink beam. Further, when the MAC CE is to activate a data beam, the performing unit 202 is further configured to dynamically determine one of the activated data beams as a transmitting beam of a PDSCH or a PUSCH through DCI. The DCI is transmitted by the transmitting unit 201 to the UE.

In addition, in order to reduce signaling overhead, a single MAC CE may be designed to activate or deactivate the uplink TCI state and the downlink TCI state for uplink and downlink respectively. For example, the uplink TCI states and the downlink TCI states at least partially share the IDs, and the transmitting unit 201 is configured to transmit, to the UE, a MAC CE including an ID of a target TCI state as a shared ID, to simultaneously activate or deactivate an uplink TCI state and a downlink TCI state corresponding to the shared ID. In such a case, the ID of the target TCI state is an ID of a to-be-activated TCI state or a to-be-deactivated TCI state. For an example of a case where the uplink TCI states and the downlink TCI states partially share the IDs, reference can be made to FIG. 3, which is not described redundantly herein.

In another example, the conventional TCI state may be modified to acquire a unified TCI state. For example, the configuration information of the unified TCI state includes an index to a reference signal among the uplink reference signal and the downlink reference signal. The uplink reference signal includes SRS, and the downlink reference signal includes CSI-RS and SSB. QCL types of CSI-RS, SSB and SRS each are QCL-Type D, which is related to a spatial receiving filter. For an example of the unified TCI state information element, reference can be made to FIG. 4, which is not described redundantly herein.

The transmitting unit 201 is further configured to transmit, to the UE, an indication of the target TCI state through the MAC CE or the DCI. The target TCI state herein refers to the to-be-activated TCI state, the to-be-deactivated TCI state or a to-be-indicated TCI state. The TCI state herein is the unified TCI state. For example, the MAC CE or the DCI may include the identifier of the target TCI state, such as U-tci-StateId shown in FIG. 4.

The base station may activate or deactivate one or more of the configured multiple uplink beams or downlink beams through MAC CE signaling. In a case that a control beam such as the PDCCH and the PUCCH is to be activated by MAC CE, the performing unit 202 is configured to activate a beam on a CORESET where the PDCCH and the PUCCH are located. In a case that a data beam is to be activated by the MAC CE, the performing unit 202 is further configured to dynamically determine one of the activated data beams as the transmitting beam of the PDSCH or the PUSCH through the DCI. In such a case, the TCI state indicated by the DCI is the target TCI state.

As described above, in a case that the unified TCI state includes an index to the uplink reference signal (such as SRS), the UE may determine to transmit an uplink channel such as the PUCCH or the PUSCH using a transmitting beam for transmitting an uplink reference signal corresponding to the target TCI state, and receive a downlink channel such as the PDCCH or the PDSCH using the transmitting beam.

In a case that the unified TCI state includes an index to the downlink reference signal (such as CSI-RS or SSB), the UE may determine to receive the downlink channel using a receiving beam previously for measuring a downlink reference signal corresponding to the target TCI state, and transmit the uplink channel using the receiving beam.

In addition, the UE may be equipped with multiple antenna panels, and may use an ID of an SRS resource set for uplink beam management as an ID of each of the antenna panels. During uplink beam scanning, each of the antenna panels is assigned an exclusive SRS resource set, and uses SRS resources in the resource set for uplink beam scanning.

The UE may inform a network side, such as the base station, through signaling of UE capability that the UE is equipped with multiple antenna panels. The network side may activate, through RRC signaling configuration or the MAC CE, that the UE uses a specific antenna panel or a combination of multiple antenna panels to measure the downlink reference signal (such as CSI-RS or SSB), for example, measure L1-RSRP (that is, layer-1 reference signal receiving power) or L1-SINR (that is, layer-1 signal to interference and noise ratio) received by the antenna panel or the combination of the antenna panels.

In other words, the UE may measure the downlink reference signal using one or more specified antenna panels. As a way, the UE may acquire, from the base station, information of the one or more specified antenna panels, for example, may acquire an ID of a SRS resource set corresponding to the antenna panel. As another way, the UE may determine one or more antenna panels by itself, and report IDs of the one or more antenna panels to the base station for subsequent beam indication.

In such a case, in a case that the unified TCI state includes an index to the downlink reference signal (such as CSI-RS or SSB), the UE determines to use an antenna panel previously for measuring the downlink reference signal and a beam on the antenna panel to receive the downlink channel. In other words, the receiving beam is the beam on the one or more specified antenna panels. In addition, in a case that a receiving beam of the downlink reference signal corresponds to a transmitting beam of the SRS, the receiving beam is further used to transmit the uplink channel.

In this way, the unified TCI state in the embodiment may support downlink receiving of the specified antenna panel(s) and the beam by the UE, and the unified TCI state is associated with the specific antenna panel or a combination of antenna panels.

Similarly, in a case that the unified TCI state includes the index to the uplink reference signal (such as SRS), the UE may determine an antenna panel and a beam on the antenna panel to transmit the uplink channel based on an ID of a SRS resource set where the SRS is located, and may further receive the downlink channel using the transmitting beam. The SRS resource set where the SRS is located is for the purpose of being used for Codebook or non-codebook transmitting.

Figure 9:
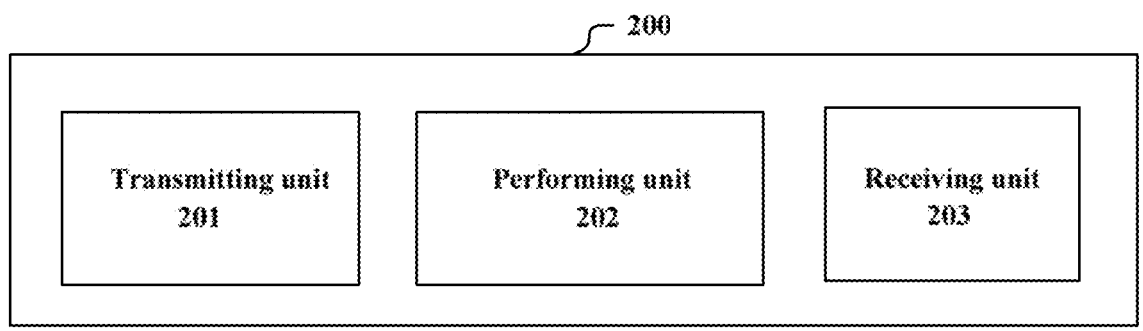
FIG. 9 is a block diagram showing functional modules of an electronic apparatus for wireless communications according to another embodiment of the present disclosure.

On the other hand, as shown in FIG. 9, the electronic apparatus 200 further includes a receiving unit 203. The receiving unit 203 is configured to receive an ID of a unified TCI state from the UE to determine that a failure occurs on uplink transmission and/or radiation exceeds MPE on an antenna panel corresponding to the unified TCI state. For example, the receiving unit 203 may receive through the MAC CE or the RRC signaling.

As described above, since the antenna panel of the UE may cause excessive radiation to the human or the antenna panel may fail, the base station may suspend actions such as beam measurement and reporting of the antenna panel upon receiving such a report. For example, the transmitting unit 201 may instruct the UE not to use the antenna panel for uplink transmission.

The UE may directly report an ID of a faulty antenna panel. In the embodiment, the unified TCI state is associated with one or more specific antenna panels, and thus the UE may report the faulty antenna panel to the base station by reporting the ID of the unified TCI state.

For an example of an information procedure between a base station and UE according to the embodiment, reference can be made to FIG. 7, which is not described redundantly herein.

In summary, the electronic apparatus 200 according to the embodiment enables, by using the unified TCI state indicating the downlink beam and uplink beam, to use the unified TCI state to simultaneously manage the downlink beam and uplink beam, reducing the signaling overhead.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 10:
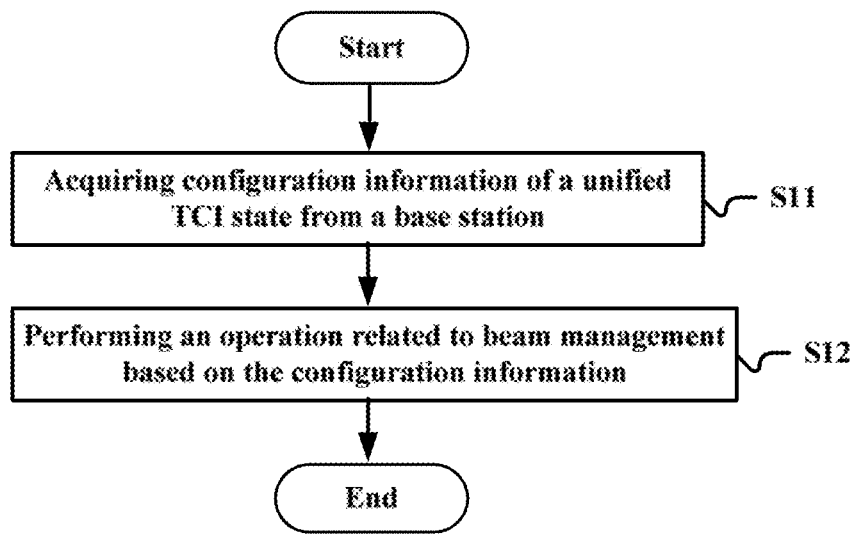
FIG. 10 is a flowchart of a method for wireless communications according to an embodiment of the present disclosure.

FIG. 10 is a flow chart of a method for wireless communications according to an embodiment of the present disclosure. The method includes the following steps S11 and S12. In step S11, configuration information of a unified TCI state is acquired from a base station. The unified TCI state is used to indicate both a downlink beam and an uplink beam. In step S12, an operation related to beam management is performed based on the configuration information. The method may be performed at the UE side.

In an example, the configuration information of the unified TCI state includes individual configuration information for an uplink TCI state and for a downlink TCI state.

For example, the uplink TCI states and the downlink TCI states at least partially share identifiers. Although not shown in FIG. 10, the method further includes acquiring, from the base station, a media access control-control element including an identifier of a target TCI state, and activating or deactivating, in a case that the identifier of the acquired target TCI state is a shared identifier, the uplink TCI state and the downlink TCI state corresponding to the shared identifier.

In another example, the configuration information of the unified TCI state includes an index to a reference signal among uplink reference signal and downlink reference signal. The uplink reference signal includes a SRS, and the downlink reference signal includes a CSI-RS and a SSB.

Although not shown in FIG. 10, the method may further include receiving an indication for the target TCI state via a MAC CE or DCI.

In a case that the unified TCI state includes an index to an uplink reference signal, the method includes determining to transmit an uplink channel using a transmitting beam for transmitting the uplink reference signal corresponding to the target TCI state, and receive a downlink channel using the transmitting beam.

In a case that the unified TCI state includes an index to the downlink reference signal, the method includes determining to receive a downlink channel using a receiving beam previously for measuring a downlink reference signal corresponding to the target transmission configuration indication state, and transmit an uplink channel using the receiving beam.

For example, the UE may measure the downlink reference signal using one or more specified antenna panels. The method further includes acquiring, from the base station, information of the one or more specified antenna panels, or may determine the one or more antenna panels by itself, and report IDs of the one or more antenna panels to the base station.

The method further includes reporting, in a case that a failure occurs on uplink transmission and/or radiation exceeds MPE, an identifier of the target TCI state to the base station, to cause the base station to determine the corresponding antenna panel based on the identifier. For example, reporting may be performed through the MAC CE or the RRC signaling.

Figure 11:
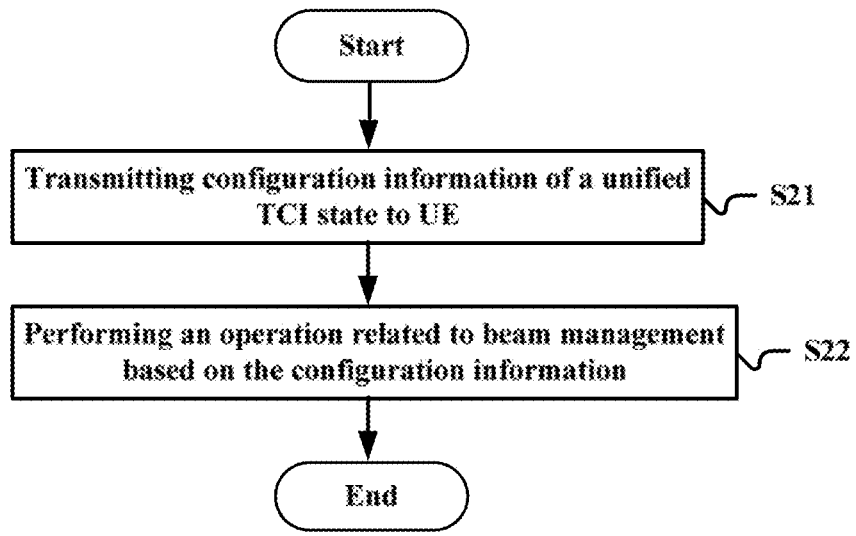
FIG. 11 is a flowchart of a method for wireless communications according to an embodiment of the present disclosure.

FIG. 11 is a flow chart of a method for wireless communications according to an embodiment of the present disclosure. The method includes the following steps S21 and S22. In step S21, configuration information of a unified TCI state is transmitted to UE. The unified TCI state is used to indicate both a downlink beam and an uplink beam. In step S22, an operation related to beam management is performed based on the configuration information. The method may be performed at a base station side.

In an example, the configuration information of the unified TCI state includes individual configuration information for an uplink TCI state and for a downlink TCI state.

For example, the uplink TCI states and the downlink TCI states at least partially share identifiers. The method further includes transmitting, to the UE, a MAC CE including an ID of a target TCI state as a shared ID, to simultaneously activate or deactivate the uplink TCI state and the downlink TCI state corresponding to the shared identifier.

In another example, the configuration information of the unified transmission configuration indication state includes an index to one reference signal among the uplink reference signal and the downlink reference signal. For example, the uplink reference signal includes a SRS, and the downlink reference signal includes a CSI-RS and a SSB.

Although not shown in FIG. 11, the method further includes transmitting, to the UE, an indication for the target TCI state via a MAC CE or DCI.

In addition, the UE measure the downlink reference signal using one or more specified antenna panels. The method further includes receiving, from the UE, an identifier of the unified TCI state, to determine that a failure occurs on uplink transmission and/or radiation exceeds MPE on an antenna panel corresponding to the unified TCI state. For example, receiving may be performed through the MAC CE or the RRC signaling.

It should be noted that the above methods may be utilized in combination or separately. The details are described in detail in the first to second embodiments, and are not repeated herein.

The technology according to the present disclosure is applicable to various products.

For example, the electronic apparatus 200 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro 10 eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipment may each serve as a base station by performing functions of the base station temporarily or semi-permanently.

The electronic apparatus 100 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

Application Example Regarding a Base Station

First Application Example

Figure 12:
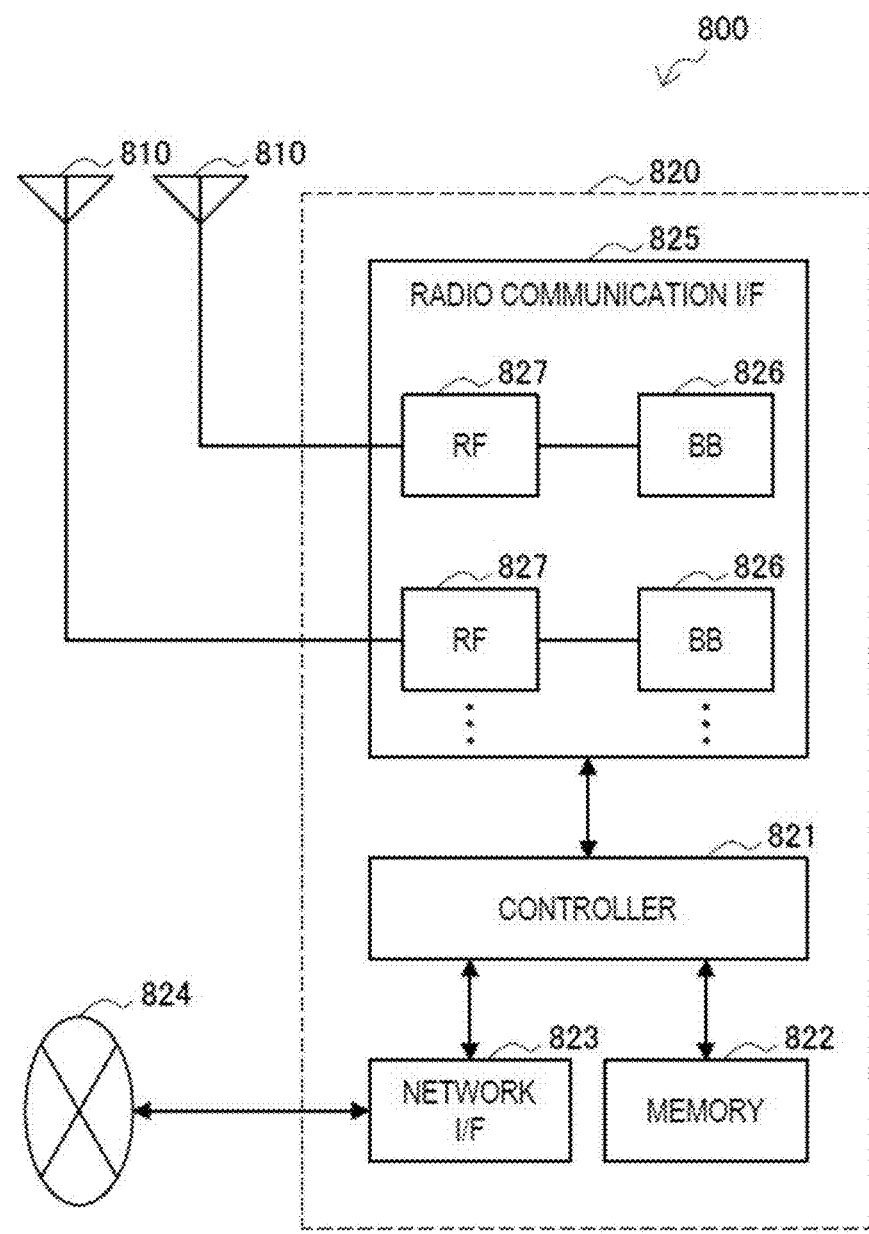
FIG. 12 is a block diagram showing a first example of an exemplary configuration of an eNB or gNB to which the technology of the present disclosure may be applied.

FIG. 12 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a RF cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 12, the eNB 800 may include the multiple antennas 810. For example, the multiple antennas 810 may be compatible with multiple frequency bands used by the eNB 800. Although FIG. 12 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 12, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 12. For example, the multiple RF circuits 827 may be compatible with multiple antenna elements. Although FIG. 12 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 12, the transmitting unit 201, the receiving unit 203 and the transceiver of the electronic apparatus 200 may be implemented by the radio communication interface 825. At least part of functions may also be implemented by the controller 821. For example, the controller 821 may perform the functions of the transmitting unit 201, the performing unit 202 and the receiving unit 203 to simultaneously manage the uplink beam and the downlink beam, thereby reducing the signaling overhead.

Second Application Example

Figure 13:
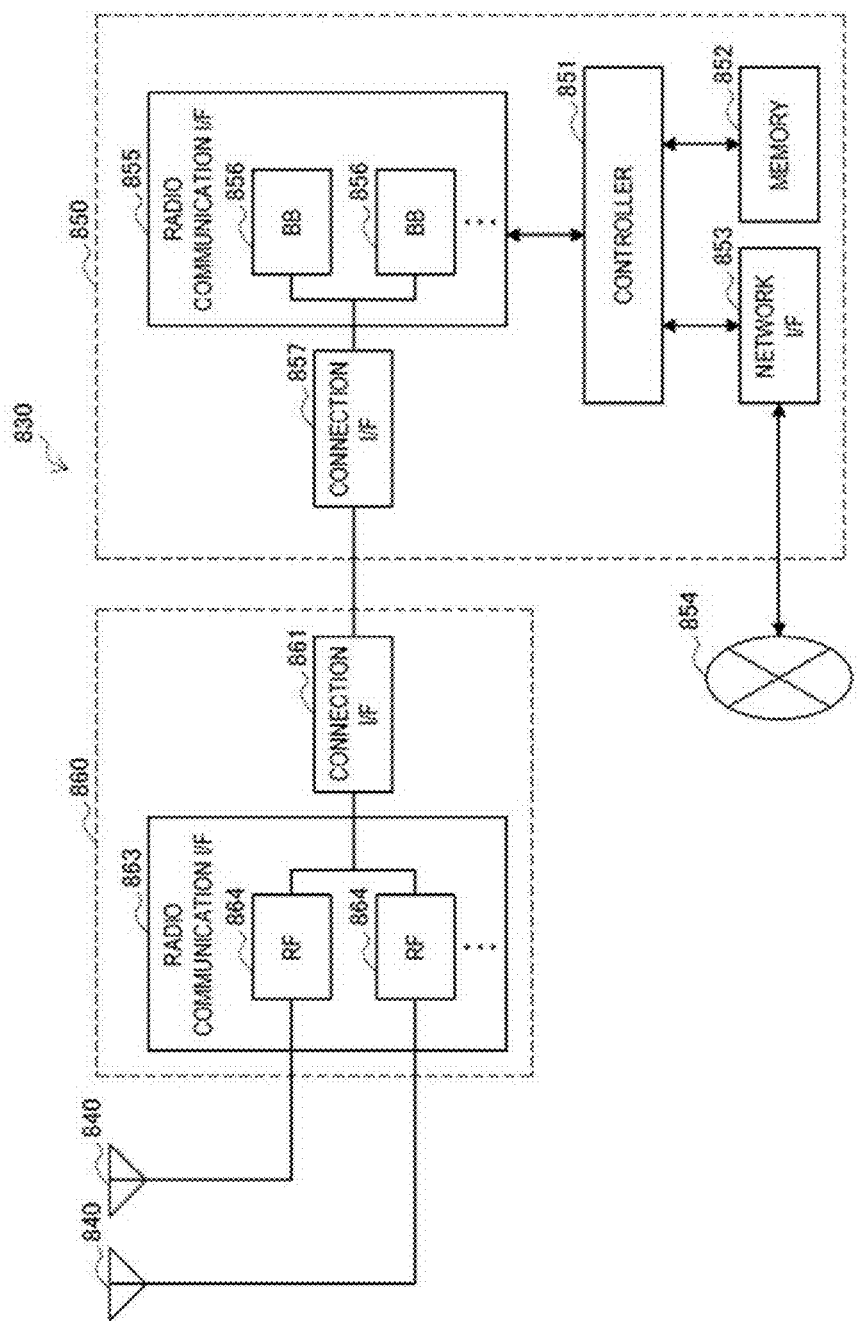
FIG. 13 is a block diagram showing a second example of an exemplary configuration of an eNB or gNB to which the technology of the present disclosure may be applied.

FIG. 13 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 13, the eNB 830 may include the multiple antennas 840. For example, the multiple antennas 840 may be compatible with multiple frequency bands used by the eNB 830. Although FIG. 13 shows the example in which the eNB 830 includes the multiple antennas 840, the eNB 830 may also include a single antenna 840).

The base station apparatus 850) includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 12.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 12, except that the BB processor 856 is connected to an RF circuit 864 of the RRH 860 via the connection interface 857. As show in FIG. 13, the radio communication interface 855 may include the multiple BB processors 856. For example, the multiple BB processors 856 may be compatible with multiple frequency bands used by the eNB 830. Although FIG. 13 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 13. For example, the multiple RF circuits 864 may support multiple antenna elements. Although FIG. 13 shows the example in which the radio communication interface 863 includes the multiple RF circuits 864, the radio communication interface 863 may also include a single RF circuit 864.

In the eNB 830 shown in FIG. 13, the transmitting unit 201, the receiving unit 203, and the transceiver of the electronic apparatus 200 may be implemented by at least one of the radio communication interface 855 and/or the radio communication interface 863. At least part of the functions may also be implemented by the controller 851. For example, the controller 851 may perform the functions of the transmitting unit 201, the performing unit 202 and the receiving unit 203 to simultaneously manage the uplink beam and the downlink beam, reducing the signaling overhead.

Application Example Regarding User Equipment

First Application Example

Figure 14:
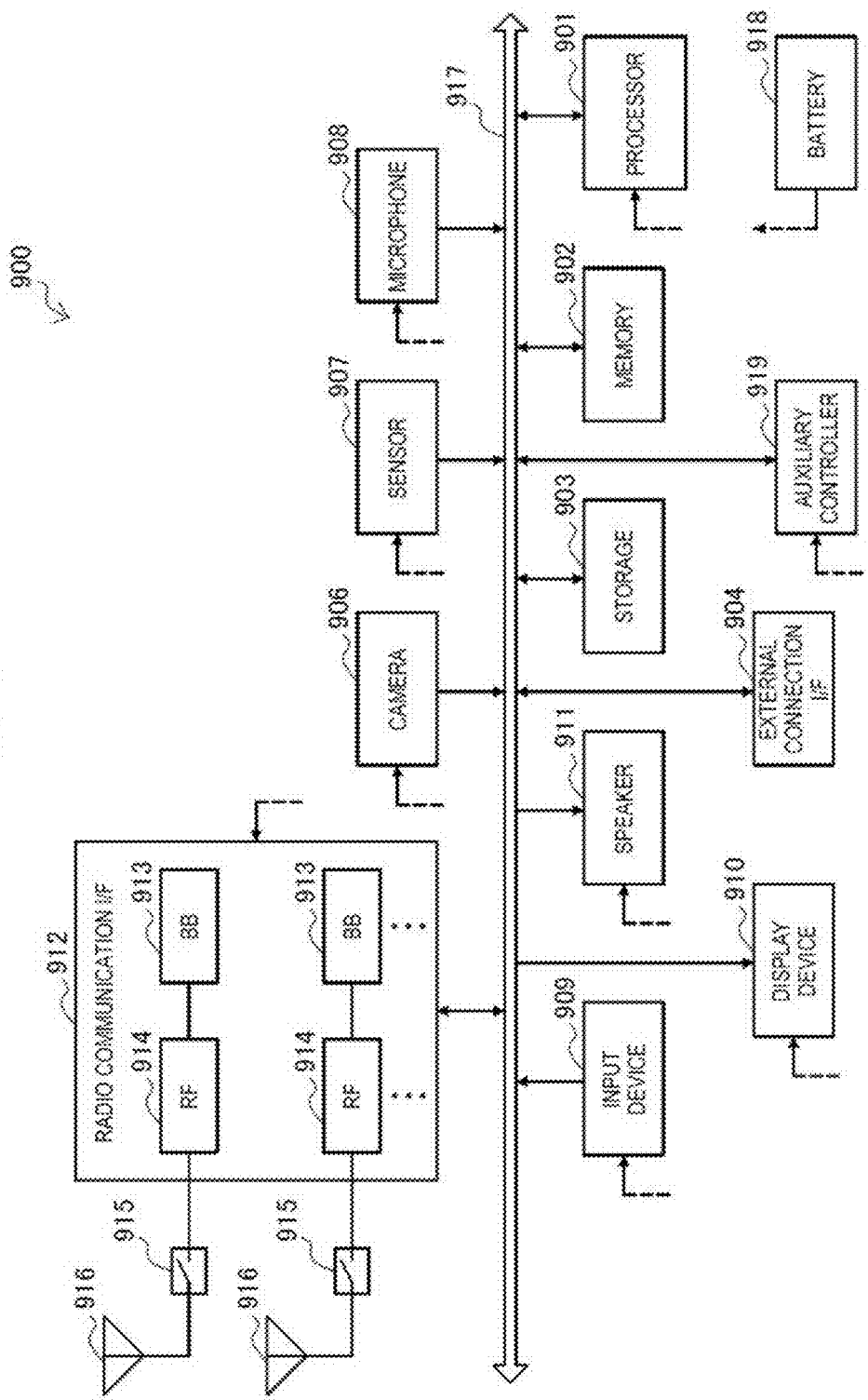
FIG. 14 is a block diagram showing an example of an exemplary configuration of a smartphone to which the technology according to the present disclosure may be applied.

FIG. 14 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 14 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 14. Although FIG. 14 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 14. Although FIG. 14 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 14 via feeder lines that are partially shown as dashed lines in FIG. 14. The auxiliary controller 919, for example, operates a minimum necessary function of the smart phone 900 in a sleep mode.

In the smart phone 900 shown in FIG. 14, the acquiring unit 101, the transmitting unit 103 and the transceiver of the electronic apparatus 100 may be implemented by the radio communication interface 912. At least part of the functions may also be implemented by the processor 901 or the auxiliary controller 919. For example, the processor 901 or the auxiliary controller 919 may perform the functions of the acquiring unit 101, the performing unit 102 and the transmitting unit 103 to simultaneously manage the uplink beam and the downlink beam, thereby reducing the signaling overhead.

Second Application Example

Figure 15:
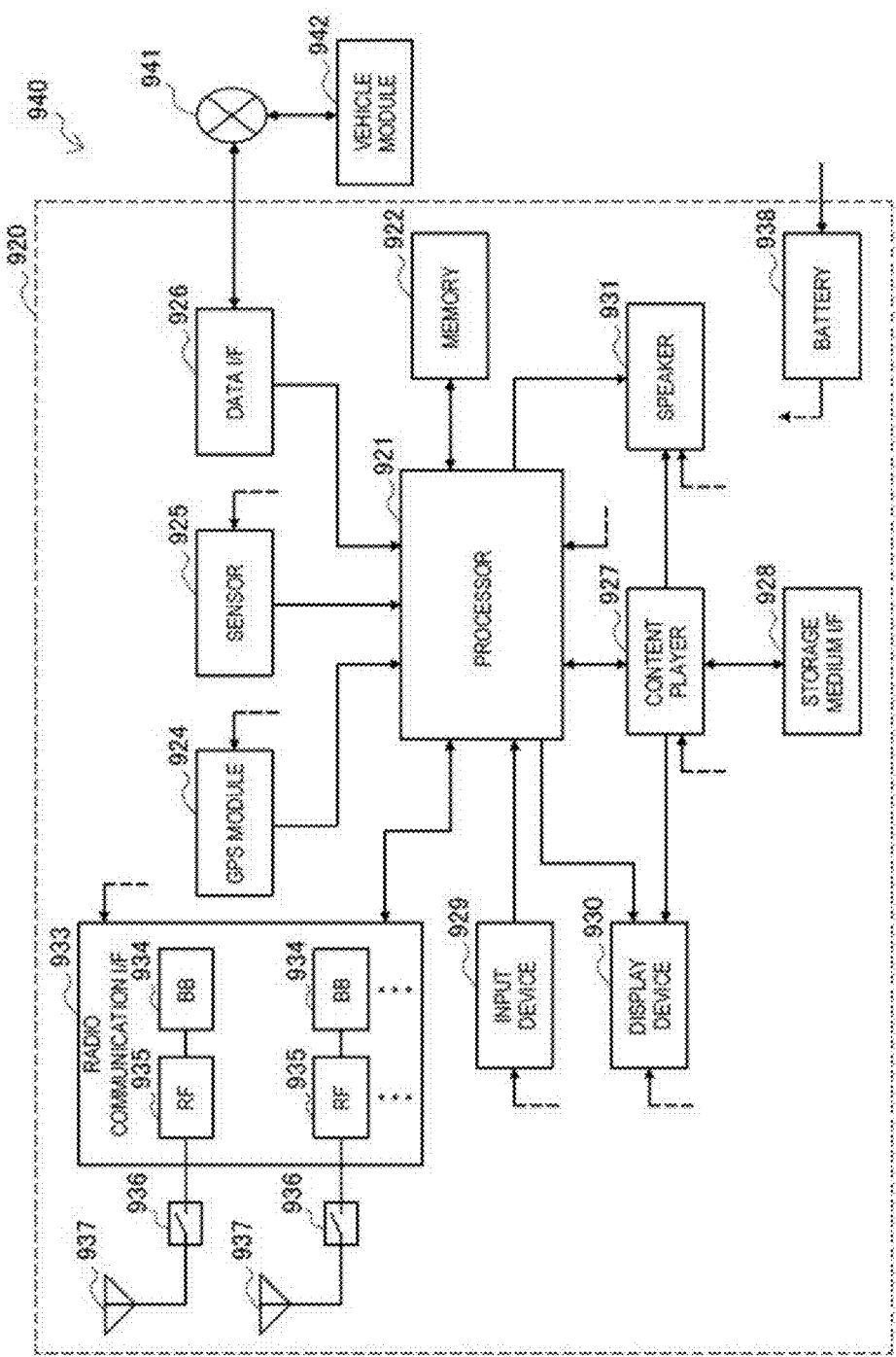
FIG. 15 is a block diagram showing an example of an exemplary configuration of a car navigation apparatus to which the technology according to the present disclosure may be applied.

FIG. 15 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 15. Although FIG. 15 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 15, the car navigation apparatus 920 may include the multiple antennas 937. Although FIG. 15 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 15 via feeder lines that are partially shown as dash lines in FIG. 15. The battery 938 accumulates power supplied from the vehicle.

In the car navigation apparatus 920 shown in FIG. 15, the acquiring unit 101, the transmitting unit 103 and the transceiver of the electronic device apparatus 100 may be implemented by the radio communication interface 933. At least part of the functions may also be implemented by the processor 921. For example, the processor 921 may perform the functions of the acquiring unit 101, the performing unit 102 and the transmitting unit 103 to simultaneously manage the uplink beam and the downlink beam, reducing the signaling overhead.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1600 shown in FIG. 16) from a storage medium or network, wherein the computer is capable of implementing various functions when installed with various programs.

Figure 16:
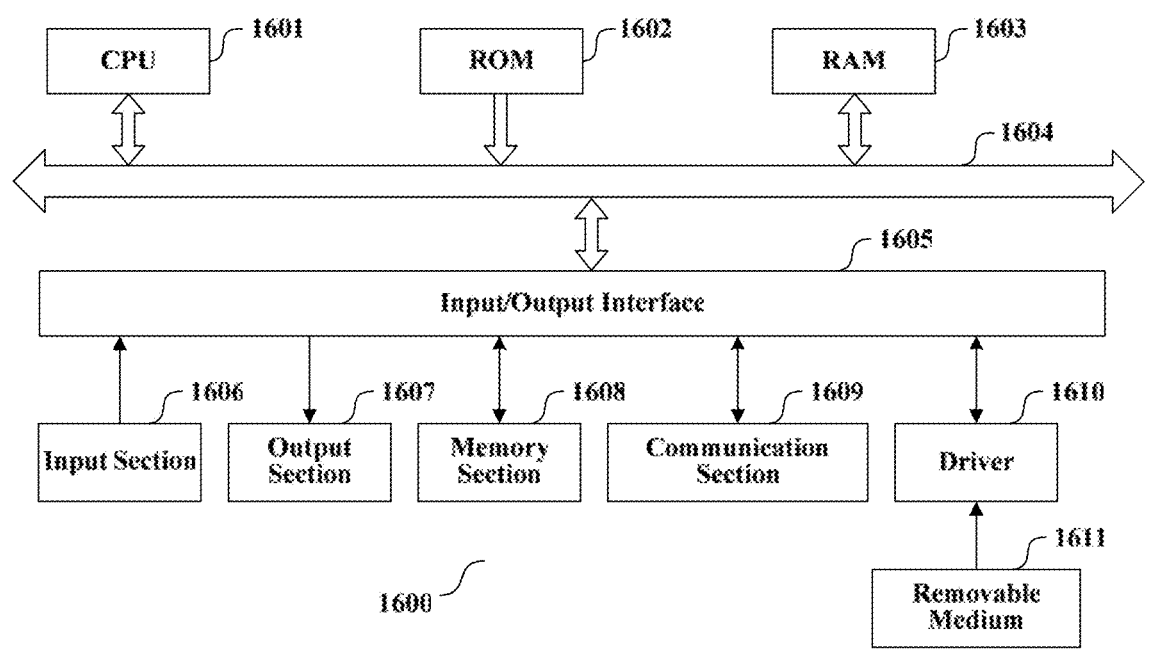
FIG. 16 is a block diagram of an exemplary block diagram illustrating the structure of a general purpose personal computer capable of realizing the method and/or device and/or system according to the embodiments of the present disclosure.

In FIG. 16, a central processing unit (CPU) 1601 executes various processing according to a program stored in a read-only memory (ROM) 1602 or a program loaded to a random access memory (RAM) 1603 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605, if needed. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved through software, programs forming the software are installed from a network such as the Internet or a memory medium such as the removable medium 1611.

It should be appreciated by those skilled in the art that the memory medium is not limited to the removable medium 1611 shown in FIG. 16, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a (n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:

processing circuitry, configured to:
acquire, from a base station, configuration information of a unified transmission configuration indication state, wherein, the unified transmission configuration indication state is used to indicate both a downlink beam and an uplink beam; and
perform an operation related to beam management based on the configuration information,
wherein the configuration information of the unified transmission configuration indication state comprises individual configuration information for an uplink transmission configuration indication state and for a downlink transmission configuration indication state, and
wherein the uplink transmission configuration indication state and the downlink transmission configuration indication state at least partially share identifiers, and the processing circuitry is further configured to:
acquire, from the base station, a media access control-control element comprising an identifier of a target transmission configuration indication state, and simultaneously activate or deactivate, in a case that the identifier of the acquired target transmission configuration indication state is a shared identifier, the uplink transmission configuration indication state and the downlink transmission configuration indication state corresponding to the shared identifier.

2. The electronic apparatus according to claim 1, wherein the configuration information of the unified transmission configuration indication state comprises an index to a reference signal among an uplink reference signal and a downlink reference signal,
wherein the uplink reference signal comprises a sounding reference signal, and the downlink reference signal comprises a channel state information-reference signal and a synchronization signal block.

3. The electronic apparatus according to claim 2, wherein the processing circuitry is further configured to receive an indication for a target transmission configuration indication state via a media access control-control element or downlink control information.

4. The electronic apparatus according to claim 3, wherein the processing circuitry is further configured to measure the downlink reference signal using one or more specified antenna panels.

5. The electronic apparatus according to claim 4, wherein the processing circuitry is further configured to:
acquire, from the base station, information of the one or more specified antenna panels; or
determine one or more antenna panels by itself, and report identifiers of the one or more antenna panels to the base station.

6. The electronic apparatus according to claim 3, wherein in a case that the unified transmission configuration indication state comprises an index to an uplink reference signal, the processing circuitry is configured to:
determine to transmit an uplink channel using a transmitting beam for transmitting the uplink reference signal corresponding to the target transmission configuration indication state, and receive a downlink channel using the transmitting beam.

7. The electronic apparatus according to claim 4, wherein in a case that the unified transmission configuration indication state comprises an index to the downlink reference signal, the processing circuitry is configured to:
determine to receive a downlink channel using a receiving beam previously for measuring a downlink reference signal corresponding to the target transmission configuration indication state, and transmit an uplink channel using the receiving beam.

8. The electronic apparatus according to claim 7, wherein the receiving beam is a beam on the one or more specified antenna panels, or
wherein the receiving beam corresponds to a transmitting beam of a sounding reference signal.

9. The electronic apparatus according to claim 8, wherein the processing circuitry is further configured to:
report, in a case that a failure occurs on uplink transmission or in a case that radiation exceeds maximum permissible exposure, an identifier of the target transmission configuration indication state to the base station, to cause the base station to determine a corresponding antenna panel based on the identifier.

10. The electronic apparatus according to claim 9, wherein the processing circuitry is configured to perform reporting through the media access control-control element or radio resource control signaling.

11. An electronic apparatus for wireless communications, comprising:
processing circuitry, configured to:
transmit, to user equipment, configuration information of a unified transmission configuration indication state, wherein the unified transmission configuration indication state is used to indicate both a downlink beam and an uplink beam; and
perform an operation related to beam management based on the configuration information,
wherein the configuration information of the unified transmission configuration indication state comprises individual configuration information for an uplink transmission configuration indication state and for a downlink transmission configuration indication state, and
wherein the uplink transmission configuration indication state and the downlink transmission configuration indication state at least partially share identifiers, and the processing circuitry is further configured to:
transmit, to the user equipment, a media access control-control element comprising an identifier of a target transmission configuration indication state as a shared identifier, to simultaneously activate or deactivate the uplink transmission configuration indication state and the downlink transmission configuration indication state corresponding to the shared identifier.

12. The electronic apparatus according to claim 11, wherein the configuration information of the unified transmission configuration indication state comprises an index to a reference signal among an uplink reference signal and a downlink reference signal,
wherein the uplink reference signal comprises a sounding reference signal, and the downlink reference signal comprises a channel state information-reference signal and a synchronization signal block.

13. The electronic apparatus according to claim 12, wherein the processing circuitry is further configured to transmit, to the user equipment, an indication for a target transmission configuration indication state via a media access control-control element or downlink control information.

14. The electronic apparatus according to claim 12, wherein the user equipment measures the downlink reference signal using one or more specified antenna panels, and the processing circuitry is further configured to:

receive, from the user equipment, an identifier of the unified transmission configuration indication state, to determine that a failure occurs on uplink transmission or to determine that radiation exceeds maximum permissible exposure on an antenna panel corresponding to the unified transmission configuration indication state.

15. The electronic apparatus according to claim 14, wherein the processing circuitry is configured to receive the identifier through the media access control-control element or radio resource control signaling.

16. A method for wireless communications, comprising:
acquiring, from a base station, configuration information of a unified transmission configuration indication state, wherein, the unified transmission configuration indication state is used to indicate both a downlink beam and an uplink beam; and
performing an operation related to beam management based on the configuration information,
wherein the configuration information of the unified transmission configuration indication state comprises individual configuration information for an uplink transmission configuration indication state and for a downlink transmission configuration indication state, and
wherein the uplink transmission configuration indication state and the downlink transmission configuration indication state at least partially share identifiers, and the method further comprises:
acquiring, from the base station, a media access control-control element comprising an identifier of a target transmission configuration indication state, and simultaneously activating or deactivating, in a case that the identifier of the acquired target transmission configuration indication state is a shared identifier, the uplink transmission configuration indication state and the downlink transmission configuration indication state corresponding to the shared identifier.

* * * * *